Patented Dec. 6, 1949

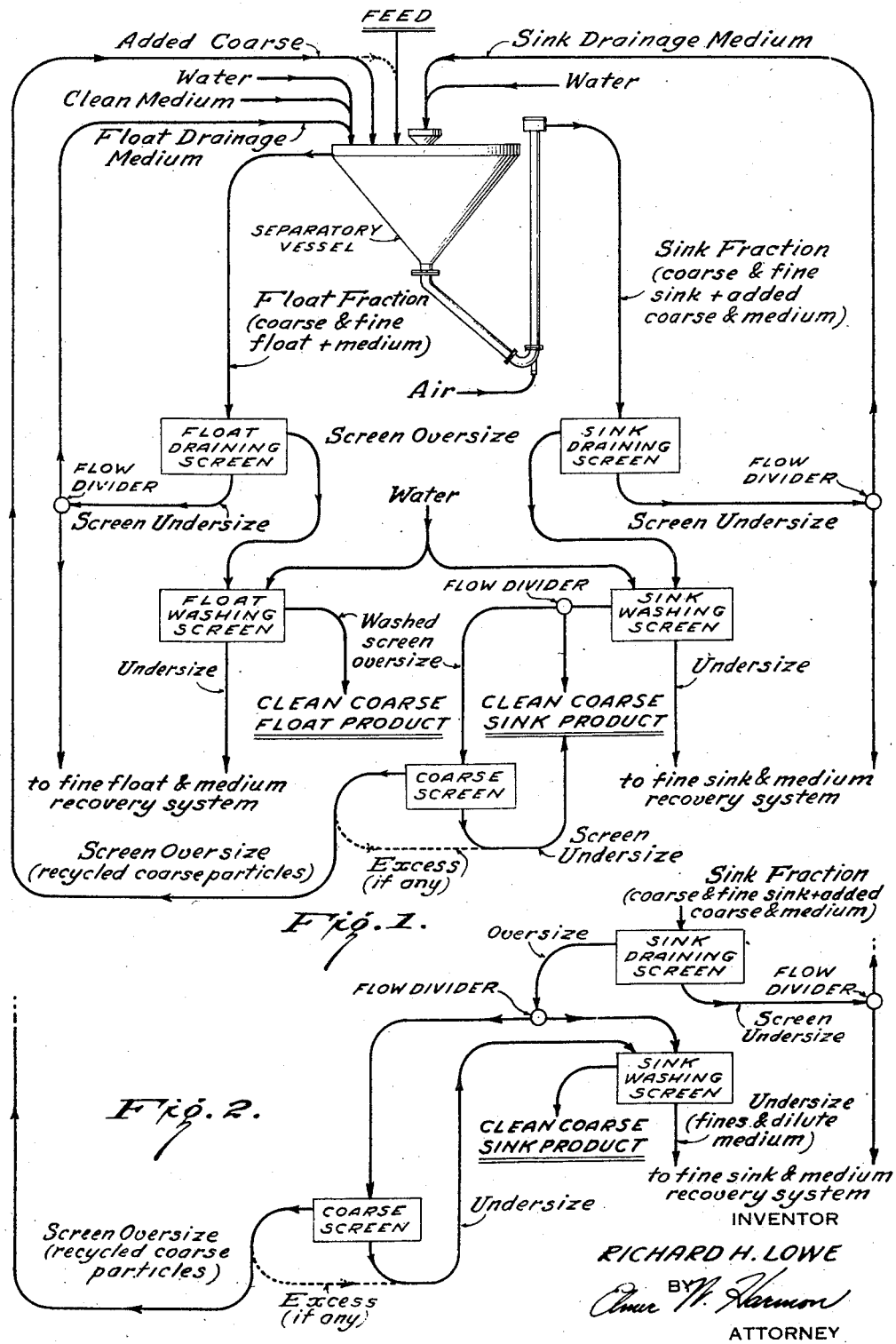

2,490,365

UNITED STATES PATENT OFFICE 2,490,365

SEPARATION OF SOLIDS BY USE OF HEAVY MEDIA

Richard H. Lowe, University City, Mo., assignor to American Cyanamid Company, New York, N. Y., a corporation of Maine Application April 19, 1946, Serial No. 663,392

2 Claims. (Cl. 209—173)

This invention relates to the separation of heterogeneous mixtures of solid particles having different apparent densities and contemplates an improved method of effecting such separation. More particularly, the invention relates to an improved handling process permitting the treatment of feed containing a greater proportion of smaller sized materials.

Much interest has been shown over the last twenty-five years in processes for the separation of mixtures of solids of varying specific gravities into their components by the so-called "sink and float" method. This field includes a number of different processes for the separation of solid mixtures by taking advantage of the different settling rates of particles having different specific gravities in a fluid of the proper density. Thus, in its simplest form, a mixture of two kinds of solid particles of different specific gravities, when immersed in a fluid having a density greater than that of one solid and less than that of the other, separates into its component parts by the tendency of the heavy materials to sink and the lighter materials to float. Various modifications have been developed for adapting this separation for use in continuously-operating processes.

In the application of these processes to continuous operation, various liquids of high specific gravity may be employed as the separatory medium. Actually, however, the only practicable fluids for use on a large scale comprise suspensions in water of suitably-sized solids, which, in their practical effect, behave like liquids of high specific gravity. A portion of the particles of such media are usually colloidal or semi-colloidal in size. Particles in this size range not only remain suspended but are also capable of maintaining the somewhat larger particles of medium in more or less permanent suspension. By properly selecting the solids, fluids of substantially any desired density can be obtained.

Mixtures to be separated are immersed in a suitable medium in a separatory vessel. Those particles having an apparent density greater than that of the separatory fluid sink therein and the lighter-gravity fraction floats thereon. The light or "float" and the heavy or "sink" fractions are then separately, and preferably continuously, collected. Using fluids of properly selected density, it is readily feasible to separate solids which differ only slightly in specific gravity.

Despite their obvious advantages, the "sink and float" processes possess certain limitations. The most serious of these limitations is the fact that from the cost standpoint, they become less and less efficient as the size of the particles of the materials to be separated is decreased, so that a fine feed cannot be economically handled. Industrially, it is ordinarily desirable to handle a feed coarser than about one-quarter inch. The inefficiency of the sink-and-float processes in handling fine feed constitutes the most serious unsolved problem of this basic method. Once fines have entered the separatory vessel their behavior is disadvantageous.

An examination of conditions in the separatory vessels is helpful in illustrating the importance of the problem. For purposes of illustration it may be considered that the feed comprises one material of greater average specific gravity than the remainder and is to be separated therefrom. This will be referred to as the "sink" portion because the separatory fluid is adjusted to a lesser density, such that the latter will sink therethrough, but great enough so that the remaining materials or "float" fraction will rise therethrough and float thereon. It is assumed that both the light and heavy materials in the present discussion are present in widely varying particle size.

In starting up, sufficient fluid is introduced to fill the separatory vessel which is assumed to be a cone of conventional design. It may be assumed for the moment that there is no upward flow and that the fluid is static. Despite the fact that the fluid is prepared as a substantially permanent suspension, a slight density-differential will be set up in the cone because the larger particles of heavy medium tend to settle. The smaller particles, having a relatively large surface area for their aggregate volume, are more readily influenced by surface-tension forces and tend to remain in the upper portion of the cone. Some separation of the particles into zones will therefore occur.

If a portion of feed is now introduced, the separation into zones becomes immediately more noticeable. The particles of the sink fraction, being of a greater density than the fluid, will all settle eventually, but the coarser sink, being less retarded than the fines by surface tension forces, settles more rapidly. While very small particles of float tend to rise more slowly than the larger, they have less inertia and therefore do not penetrate initially as far into the fluid. This tendency to size separation in the fluid is further exaggerated because the tendency of a particle, either to sink or float at any level, is no longer its rate in fluid medium alone, but its rate in fluid medium containing in addition those particles which are temporarily in that zone.

Because of these factors, among others, a layer is formed at the top of the cone which is predominantly fines. Below this fines layer are zones of successively coarser light material. The converse is true at the apex of the cone, the coarse heavy material being at the bottom but surmounted by zones of successively smaller particles of heavy material. In any case, depending upon the amount of feed added, substantially equilibrium conditions will eventually be achieved.

Further, as successive portions of feed are added, after the initial feed has come to equilibrium, freshly added particles also tend to move horizontally, due to the resistance of the particles already in suspension. This horizontal movement is quite pronounced. One of its most noticeable effects is the production of the tight crust or mat of floating fines which may be observed at the top of the fluid of conventional sink-and-float operations if attempts are made to operate them on an ungraded feed containing a large amount of fines. Coarser particles of light material must force their way through this mat before they overflow. The influence of this horizontal movement packs these upper layers into a tighter and tighter crust. This in turn increases the tendency of the particles in the immediately lower layers to move tangentially outward more readily than they move vertically.

Furthermore, a portion of these fines may agglomerate, often with entrapment of particles of the medium. Thus, particles of a relatively neutral weight, held together by surface tension and mutual gravitational forces, may form and remain in relatively static suspension. As a result of the presence of these particles, the apparent specific gravity of the medium is altered from the desired level. Hence a less sharp separation occurs, and the resulting increase in the apparent viscosity of the medium tends further to reduce the rate of throughput.

Introducing an upward flow of fluid and a continuous feed alters these conditions only by changing the relative level at which the different particles come to equilibrium unless the flow is so great as to preclude any reasonable operation. Various factors noted will still be in conjunction to prevent operation of the separation in anything like theoretically perfect conditions.

Another result produced by these various factors which is equally troublesome but less apparent to the eye, is the decreased sharpness of separation. The tendency of the smaller particles of heavier gravity material to sink more slowly than the coarse has been noted. Similarly, note was taken of the fact that the particle-supporting ability of any one zone is not that of the high-density fluid alone but that of the fluid plus the additional solids in that zone. Consequently, intermediate zones in the fluid may contain not only coarse materials which are rising or settling but also smaller particles of light-material which are more slowly rising, smaller particles of heavy-material which are falling more slowly and still smaller particles of heavy-material which settle very slowly or may be even substantially suspended.

In addition, a portion of these fines may adhere to the walls of the separatory vessel and form a layer which may interfere with the removal of the particles of sink.

Many prior attempts have been made to remove these fines continuously from the separatory medium. These attempts have included such expedients as continuous diversion of large proportions of the medium into cleaning circuits; powerful agitation of the separatory medium within the separatory vessel; injection of clean medium into the central mass of the separatory fluid; and the bleeding of contaminated medium from the central mass of the separatory liquid. However, in none of them has there been found the combination of simplicity, cheapness and efficiency which is most desirable for a commercially successful operation.

In actual practice, even with the better of these processes, it becomes necessary to discontinue operations periodically. The feed is shut off, and the accumulation of fines is reduced by passing contaminated medium through the cleaning circuit until its specific gravity and viscosity become substantially that of fresh medium. Operations are then resumed. While these steps are tedious and require immobilization of valuable equipment, they have been considered essential.

It is, therefore, the principal object of the present invention to develop a process for diminishing the formation of static, stratified masses or "islands" within the body of the medium. It is a further object of this invention to promote the fall or rise and subsequent removal of middling particles of such size that they normally would reach a static condition in the separatory cone. It is also an object of this invention to prevent the tendency of fines to build up masses or concentrations on the side of the separatory vessel.

In accordance with the present invention, these principal objects are readily accomplished. The desired results are quite simply and easily obtained by circulating added portions of particulate material, substantially coarser than the average particle size of the mixture to be treated, through the fluid along with the particles of the mixture being treated.

The objects of the present invention are most conveniently accomplished when the added coarse particles are of approximately the same specific gravity as the "sink" portion of the material being treated and this is the preferable method. This invention, therefore, will be discussed principally in relation thereto. The invention, however, is not so limited. A similar improvement may be effected by injecting added coarse particles of a light material at a point at or near the bottom of the separatory vessel. The coarse light particles, as they rise through the separatory medium, produce an effect similar to that caused by the heavy particles as they sink. Such a procedure, however, is not as simple mechanically as the preferred embodiment. The process of this invention also provides for partial or complete recirculation of these added particles when a sufficient supply cannot otherwise be obtained.

The coarse, heavy material to be added is normally and preferably composed of large fragments of the "sink" fraction of the material undergoing separation. However, the present invention is not limited to this choice, as other materials have proved satisfactory. For example, in the separation of hematite ores magnetite may be employed. The basic considerations are, that the coarse heavy material should be of approximately the same specific gravity as the "sink" fraction of the feed; that it should be relatively hard, and not subject to excessive detrition; that it should not set up an electric couple with the separatory equipment or the materials being separated or react with them chemically; or contaminate the ore being subject to beneficiation. Thus, in the beneficiation of iron ore it would clearly be undesirable to use an easily friable mineral rich in lead, zinc or phosphorus.

It is not possible to prescribe exactly the proportion of the heavy, coarse material to be added to the feed as this will depend largely upon highly variable factors such as the amount of interfering fines in the feed, the density, compactness and thickness of the static, stratified barriers or "islands"; the difference between the specific gravity of the separatory medium and the specific gravity of the added material; the surface tension of the separatory fluid; and the physical characteristics of the particles of fines or slimes present. These factors vary with each type of ore treated, and may vary unpredictably from day to day in the case of large-scale operations, particularly where the plant is treating similar ores obtained from different deposits. However, the fragments should be added in such proportions as will produce the result desired.

It is the surprising feature of this invention that these added portions, while increasing the amount of feed going to the separatory vessel, do not reduce the effective output of the vessel but actually increase it over a period of time, since the formation of static, stratified barriers or "islands" can be controlled, and the separating efficiency of the unit for a given rate of feed can be greatly increased.

It is a further and important feature of the present invention that no special pumps, airlifts, or piping is required. On the contrary, it can be applied to any new or existing commercial heavy-media separatory installation by the adaptation thereto of conventional screens and conveyor belts without the necessity of making costly alterations.

The invention may be more fully illustrated by a description of its specific adaptation to separatory processes of the better types such as those disclosed in U. S. Patent 2,387,866 to G. B. Walker and/or in the application for United States Letters Patent, Serial No. 618,759, filed September 26, 1945, by Corbin Marsh. Such adaptations are shown in the accompanying drawings in which:

Figure 1 shows a schematic added coarse sink recirculation system, and

Figure 2 shows another modification thereof.

The feed, usually an ore, is generally pretreated. Ordinarily, it is the general practice to break down the ore, usually by crushing, for convenience in handling. Generally, too, it is washed and/or deslimed. These need not be considered as essentially a part of the heavy-media preparation since they are usual for other purposes, particularly if flotation is to be used on part of the ore. However, in the part, as noted above, it was quite generally the practice to subject the feed to screening or hydraulic separation to eliminate excessive amounts of the smaller sizes, usually all the minus 3/16 inch. While washing and desliming are helpful to the operation of the present invention, the removal of all minus 3/16 or 1/4 inch sizes is not essential. A much smaller size, in some cases down to 48–60 mesh, or even finer may be used as the lower limit.

With regard to the general flow scheme, as illustrated, feed, comprising a wide size range of particles, is introduced into the top of a body of separatory fluid in a conventional cone, or other suitable vessel. The added coarse heavy particles are also fed into the top of the cone; preferably as a separate feed, but, as shown, if so desired in admixture with the feed. The lighter or "float" fraction of the feed plus medium, is overflowed at the top of the vessel and the heavy or "sink" fraction withdrawn from the bottom of the cone as in a conventional operation.

The float fraction is passed directly to a draining screen, screen oversize from which is washed and collected as a clean, coarse float product. The draining screen undersize, comprising fine float and medium is usually divided, a portion being directly recycled. Since it contains some fines and hence has a lesser density than the average of the separatory fluid, it is preferably returned to the top of the heavier separatory fluid body as a diluent of the heavier clean medium introduced as makeup fluid. This also serves the purpose of permitting any fine float which separates therefrom to be quickly discharged from the vessel. Thus the amount of fine float, so returned, is about constant and choking of the vessel with returned float is prevented. The balance of this fluid, together with the washings, is passed to a suitable medium and/or fine float recovery system, which being conventional and forming no part of the present invention is not illustrated. One excellent system is shown in the above-identified Walker patent.

Underflow from the separatory cone, comprising the heavy or "sink" fraction, the coarse, heavy, added particles, and medium, is separately treated. This fraction is drawn from the bottom of the cone and discharged upon a sink draining screen. The draining screen undersize, comprising sink fines and medium, is treated in the same manner as the "float" screen undersize, a part being recycled as drainage medium and a part being sent to the cleaning system. Since the recycled fraction contains some sink fines its density is somewhat higher than the average of the separatory fluid and it is therefore preferably returned to the vessel at a low level. The sink draining screen oversize, comprising the coarse added particles and the sink portion of the feed, is passed over a washing screen, the washings being sent to the cleaning system. The sink washing screen oversize constitutes clean coarse sink product and may be collected as such.

Since in the preferred operation the added coarse is collected as part of the clean coarse sink, in accordance with the present invention provision is made to recycle all or a part of the coarse heavy added particles. As shown in Figure 1, a suitable proportion of the sink washing screen oversize is passed over a screen somewhat coarser than the draining and washing screen. This results in the segregation of the largest particles from the separately screened fraction. As much as necessary of this coarsest fraction is returned to the top of the cone. If there is any appreciable excess it is, along with the screen undersize combined with the unscreened portion as the clean, coarse sink product.

While this procedure has the virtue of simplicity it recycles the added coarse as a clean product. This is unnecessary and is obviated in the procedure of the flow scheme of Figure 2. There a similar flow scheme is employed but differs from that of the previous plan by sending a part of unwashed screen oversize from the drainage screen to the coarse screen. Screen oversize from the latter, prewetted with the medium adherent thereto, is sent to the top of the vessel as the added coarse fraction. Any excess screen oversize from the coarse screen, the screen undersize therefrom, and the remainder of the sink drainage screen oversize are sent to the washing screen. The washing screen oversize constitutes the clean coarse sink product. The drainage screen undersize is divided as in Figure 1, a part being returned directly to the separatory vessel as separatory fluid, and the remainder, together with the washing screen underflow, being sent to the fine sink and/or medium recovery system.

As noted above, the fines recovery and/or medium cleaning system form no part of the present invention and may be of any suitable type. Where a high percentage of small size particles, i. e., minus about $\frac{1}{16}$–$\frac{1}{8}$ inch particles, is present, the "twin-cleaning" circuits of the above identified Walker patent is particularly preferable. For other mixtures any suitable recovery system of conventional practice may be employed.

While the invention has been particularly described using a portion of the coarse content of the sink product as the added coarse fraction, as noted above the invention is not so limited. The added coarse may be heavy and collected with sink without being a part of the original sink fraction of the feed. For example, coarse particles of some magnetizable material may be used. These are easily magnetically recovered for reuse from either the washed or unwashed sink or float fractions. Since they are to be recycled, any medium adherent thereto does no harm although the recycled material should preferably be demagnetized before reuse.

I claim:

1. In a continuous separation of at least one component from a mixture of particles of materials of different specific gravities and of different sizes by immersing the mixture in a body of separatory fluid, said fluid comprising a suspension in water of a sufficient amount of finely-divided solid particles to produce a fluid medium of an apparent density such that particles of sufficient mass of the higher-gravity and lower-gravity components of the mixture fall and rise therethrough respectively, but particles of lesser mass tend to be suspended as substantially static strata in hydraulic equilibrium within an intermediate zone of said fluid: the improvement which consists in introducing an amount of chemically-compatible particulate material substantially coarser than the average particle size of the mixture being treated and differing in specific gravity both from the average specific gravity of said mixture and from the specific gravity of said fluid, into said fluid at a level adapted to permit travel of the added material through a substantial depth of said fluid, whereby said substantially static strata are broken up and dispersed, and collecting the resulting fractions which respectively float and sink.

2. A process according to claim 1, characterized in that the added particulate material is of a specific gravity greater than the average specific gravity of the mixture of materials being treated, is introduced at an upper level of the separatory fluid and is removed from the separatory vessel with the sink fraction.

RICHARD H. LOWE.

REFERENCES CITED

The following references are of record in the file of this patent:

UNITED STATES PATENTS

| Number | Name | Date |
|---|---|---|
| 2,190,637 | Rakowsky | Feb. 13, 1940 |